United States Patent
Cavness

(10) Patent No.: US 7,203,299 B1
(45) Date of Patent: Apr. 10, 2007

(54) METHODS AND APPARATUS FOR USING AIN TECHNIQUES TO FORWARD ANSWERED CALLS TO ONE OF A PLURALITY OF VOICE MAILBOXES

(75) Inventor: Joe Scott Cavness, Lewisville, TX (US)

(73) Assignee: Verizon Services Corp., Silver Spring, MD (US)

( * ) Notice: Subject to any disclaimer, the term of this patent is extended or adjusted under 35 U.S.C. 154(b) by 92 days.

(21) Appl. No.: 10/439,829

(22) Filed: May 16, 2003

Related U.S. Application Data

(60) Provisional application No. 60/466,481, filed on Apr. 30, 2003.

(51) Int. Cl.
*H04M 3/42* (2006.01)
(52) U.S. Cl. .............................. 379/211.02; 379/207.02
(58) Field of Classification Search ............. 379/88.25, 379/142.02, 265.02, 211.02, 207.02, 201.01, 379/88.22
See application file for complete search history.

(56) References Cited

U.S. PATENT DOCUMENTS

| | | | | |
|---|---|---|---|---|
| 5,692,033 A * | 11/1997 | Farris | | 379/67.1 |
| 6,456,709 B1 * | 9/2002 | Cox et al. | | 379/218.01 |
| 6,792,094 B1 * | 9/2004 | Kirkpatrick | | 379/209.01 |
| 2004/0218734 A1 * | 11/2004 | Gilbert et al. | | 379/76 |
| 2005/0031112 A1 * | 2/2005 | Bezner et al. | | 379/211.02 |

\* cited by examiner

*Primary Examiner*—Fan Tsang

*Assistant Examiner*—Olisa Anwah

(57) ABSTRACT

AIN based call routing and transfer methods are disclosed. In various embodiments call routing is based upon the availability of the requested party at the called premise and entered DTMF signals. DTMF signals and AIN mid-call triggers are used in some embodiments to support call transfer to voice mail and other services. DTMF signals and TAT triggers are used in other embodiments to support call transfer to voice mail and other services.

14 Claims, 4 Drawing Sheets

METHODS AND APPARATUS FOR USING AIN TECHNIQUES TO FORWARD ANSWERED CALLS TO ONE OF A PLURALITY OF VOICE MAILBOXES

RELATED APPLICATIONS

This application claims the benefit of U.S. Provisional Patent Application No. 60/466,481 filed Apr. 30, 2003.

FIELD OF THE INVENTION

The present invention is directed to communications systems and, more particularly, to methods and apparatus for forwarding calls which are answered by an individual other than the individual to which the caller seeks to speak.

BACKGROUND OF THE INVENTION

Telephone service users, e.g., residential customers, families, sales people, small businesses, and individuals, have come to rely on the ability of the public switched telephone network (PSTN) to provide a host of voice services including voice mail, telephone conferencing, call transfer, etc.

In order to provide enhanced telephone services, many telephone companies now implement a telephone communications network as an Advanced Intelligent Network (AIN) which has made it easier to provide a wide array of previously unavailable telephone services. In an AIN system, telephone central offices, each of which serves as a signal switching point (SSP), detect one of a number of call processing events identified as AIN "triggers". An SSP which detects a trigger suspends processing of the call which activated the trigger, compiles a call data message and forwards that message via a common channel interoffice signaling (CCIS) link to a database system, such as a Service Control Point (SCP). The Signal System 7 (SS-7) protocol is normally used for forwarding such messages. The SCP may be implemented as part of an integrated service control point (ISCP). If needed, the SCP can instruct the central office SSP at which the AIN trigger was activated to obtain and forward additional information, e.g., information relating to the call. Once sufficient information about the call has reached the ISCP, the ISCP accesses stored call processing information or records (CPRs) to generate from the received message data, a call control message. The call control message is then used to instruct the central office on how to process the call which activated the AIN trigger.

As part of the call control message, an ISCP can instruct the central office to send the call to an outside resource, such as an intelligent peripheral (IP) using a send to outside resource (STOR) instruction. IPs are frequently coupled to SSPs to provide message announcement capabilities, voice recognition capabilities and other functionality which is not normally provided by the central office. The control message is normally communicated from the ISCP to the SSP handling the call via the CCIS/SS-7 link. Once received, the SSP completes the call in accordance with the instructions received in the control message.

One service which could use improvement is voice mail for residential customers or small businesses who do not have a PBX user capability. When a family member answers a phone call that is not intended for them and the requested party is not at home or does not wish to be disturbed, the calling individual may wish to leave a message for the requested individual. The person who answered the phone can either write down the message, memorize the message or tell the calling party to hang-up, recall and then allow the call to go unanswered thus resulting in the call going to voice mail, e.g., an answering service, assuming the family subscribes to a voice mail service.

If the message was written down, it may be illegible or include errors. If the message was memorized, some or all of the content may be forgotten or distorted. The person recording the message must relay the message to the intended individual either by leaving it in a location where he hopes the intended individual will find it or by attempting to contact the intended individual by some other means, for example, paging or E-mail. Requiring the calling party to hang-up, recall, and then allowing the call to go unanswered thus transferring to voice mail is inconvenient and may incur additional cost. In view of the above discussion, it is clear that a need exists for a better product, e.g., service, for residential users and small businesses which would allow answered phone calls, intended for a different recipient, to be directed to the voice mailbox for the intended individual. It is desirable that any new service be capable of being implemented without the need for special equipment or a PBX at the customer's premise.

SUMMARY OF THE INVENTION

The present invention is directed to methods and apparatus for providing an answering party the ability to send a call to a voice mailbox associated with an individual, e.g., family member whom the calling party was trying to contact. The method and apparatus of the present invention are implemented using AIN call processing techniques thereby avoiding the need for any special telephone equipment at a service subscriber's premise. Centralized, e.g., network based, control of the service, e.g., via an SCP, allows information corresponding to multiple subscribers to be stored, maintained and updated at a centralized location. Information regarding other services, e.g., AIN services, to which a subscriber may also subscribe may be stored in the subscriber's record along with the mailbox information used to provide the current service. A service identifier value, e.g., an * or other value which can be entered using DTMF signaling by pressing a telephone key, can be used to indicate the service a subscriber is seeking to obtain at any given time. The values following the service identifier value are interpreted in accordance with the present invention as a function of the service indicated by the service identifier value. By requiring a user to press at least two keys to initiate a transfer to a voice mailbox, accidental transfers are avoided and compatibility with other AIN services is easily achieved.

Various embodiments of the present invention are directed to novel and efficient methods of transferring a call to voice mail by, for example, a residential user (family) or small business who does not have a Key System/PBX access, but does have a DTMF capable phone. The present invention provides telephone companies with the opportunity to add new voice mail products and thereby increase sales and usage of network voice mail. The planned services are designed so that they do not interfere with the other telephone services.

The present invention would allow answered phone calls directed to a family member who is not at home or does not wish to be disturbed to be efficiently transferred or forwarded to his voice mail without requiring the calling party to hang up and initiate a new call.

Various embodiments are directed to methods and apparatus for providing network services, e.g., Voice Mail services, that utilize AIN capabilities of a telephone system including, e.g., telephones, service control points, e.g., an integrated service control point (ISCP), and digital telephone switches. One or more intelligent peripherals (IPs), e.g., Voice Mail intelligent peripherals (Voice Mail IPs) may also be used.

In one embodiment, an intelligent peripheral (IP) is connected to each call that is directed to a service subscriber. The IP monitors the call for a preselected period of time for a call transfer signal, e.g., a DTMF signal, that can be entered by a party answering the phone after realizing the call should be sent to a voice mailbox. Different DTMF tones, or pairs of DTMF tones, may be entered to transfer the call to the voice mailboxes of different family members. Upon detecting a call transfer signal, the IP connects the call to the indicated voice mailbox and terminates the connection with the called party. If the IP fails to detect a transfer signal in a preselected period of time, e.g., the first 45 seconds after the call is answered, the IP drops off the call allowing the call to complete in the normal manner. In this way, the IP is not tied up monitoring the answered call for the duration of the call.

In another embodiment, the call transfer feature of the present invention is implemented through the use of an AIN mid-call trigger and a switch hook flash, sometimes called a hook flash for short. In such an embodiment, the hook flash activates an AIN trigger, e.g., a mid call trigger, set on the user's line. AIN triggers which are activated by a switch hook flash are sometimes called hook flash triggers. Table 4-1 of Bellcore document GR-1298-CORE (Issue 4, September 1997 w/revision 1, October 1998) lists several AIN hook flash triggers. As a result of activation of the hook flash mid-call trigger, the ISCP, in accordance with the present invention, is contacted by the user's switch. The SCP then instructs the switch to couple the call to an IP which monitors for a call transfer signal, e.g., DTMF signals. The reception of the appropriate DTMF signals will result in call transfer, for example, to an appropriate voice mailbox corresponding to a particular family member identified by a set of received DTMF tones.

Various additional features and advantages of the present invention will be apparent from the detailed description which follows.

DETAILED DESCRIPTION

As discussed above, the present invention is directed to methods and apparatus for providing a telephone service which allows an answered call to be forwarded to a voice mailbox when the answering individual is not the person the caller is trying to contact. The call may be transferred to one of a plurality of different voice mailboxes, wherein each voice mailbox may correspond to a different family member. The voice mailboxes may be provided by the telephone company as part of the voice mail service of the invention. The telephone services of the present invention may be provided as a stand-alone service or as part of a larger telephone service package.

Figure 1:
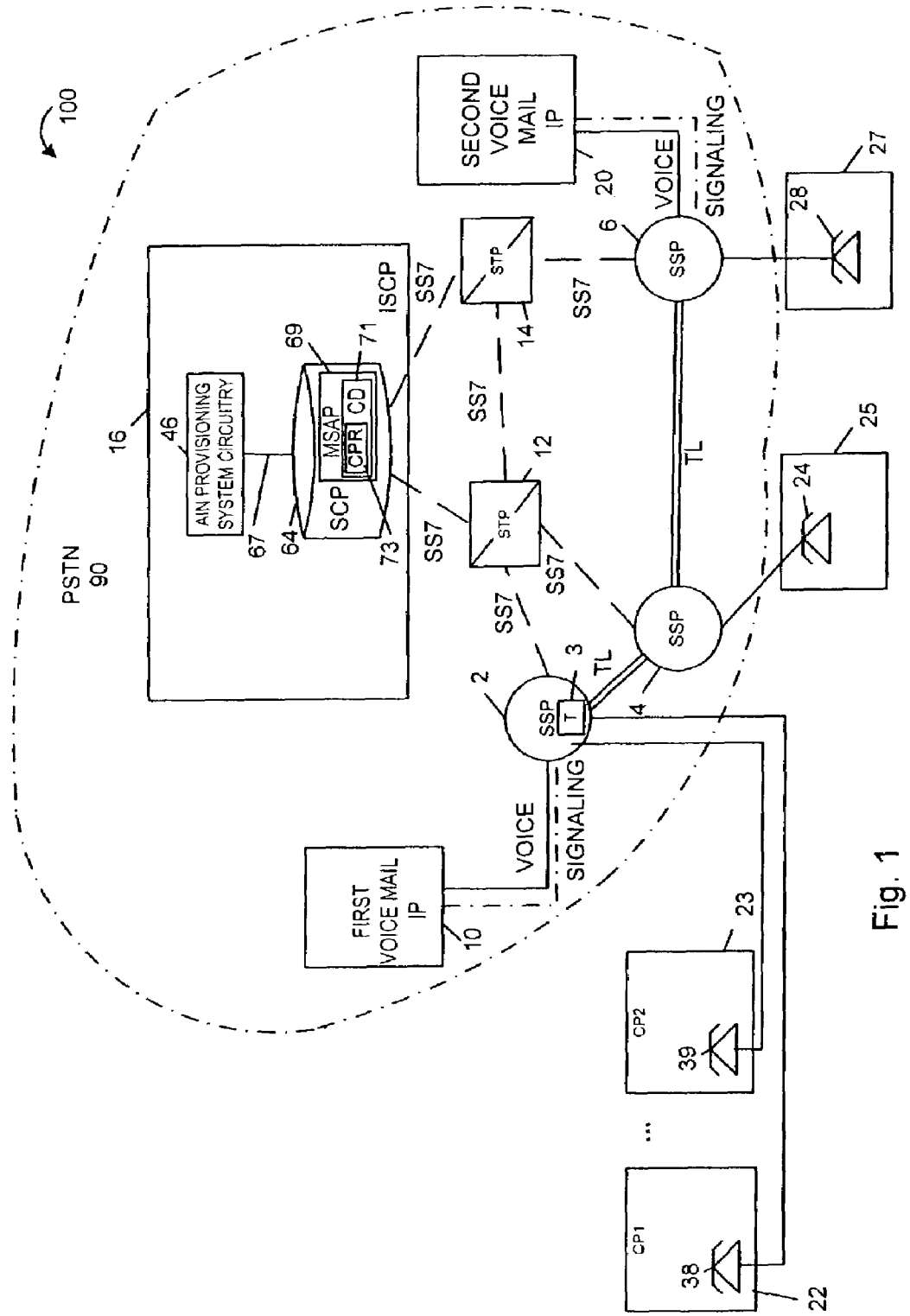
FIG. 1 illustrates a communication system implemented in accordance with an exemplary embodiment of the present invention.

FIG. 1 illustrates a communication system 100 implemented in accordance with an exemplary embodiment of the present invention. The system 100 supports communications via a public switched telephone network (PSTN) 90. The PSTN 90 includes a plurality of signal switching points (SSPs) 2, 4, 6, a plurality of signal transfer points (STPs) 12, 14, an integrated service control point (ISCP) 16, a first Voice Mail Intelligent Peripheral (IP) 10, and a second Voice mail IP 20.

The SSPs 2, 4, 6 may be implemented using known Class V telecommunications switches capable of supporting the Signaling System seven (SS7) protocol. Each SSP 2, 4, 6 may correspond to a different telephone central office. Trunk lines (TL), which may be implemented using fiber optic cables, interconnect the various SSPs 2, 4, 6.

Each SSP 2, 4, 6 is normally connected to one or more customer premises (CPs) which may include, e.g., individual subscriber residences and/or offices as well as the residences and offices of non-subscribers. In the FIG. 1 example, first and second customer premises 22 and 23 are coupled to SSP 2. Customer premises 22, 23 include telephones 38, 39, respectively. Telephones 38 and 39 are coupled to SSP 2. Additional customer premises 25, 27 include telephones 24, 28, respectively. Telephone 24, which is coupled to SSP 4, and telephone 28, which is coupled to SSP 6, are located at additional customer premises 25, 27. Connections between the SSPs and CPs may be by POTS lines, ISDN lines, DSL, or other known communications lines.

Communications equipment, referred to as customer premise equipment (CPE) is located at each customer premises 22, 23, 25, 27. Customer premise equipment may include, e.g., telephones, faxes, computers, etc. In the exemplary system of FIG. 1, land-line telephone 38 is shown as being located at the first customer premises 22.

While the second, third and fourth customer premises 23, 25, 27 are illustrated as including only landline phones, it is to be understood that they also may have any number of communications devices including, e.g., telephone, fax, and computer devices. For purposes of explanation, it will be assumed that the first customer premises 22 corresponds to a first service subscriber while the second customer premises 23 corresponds to a second service subscriber. Additional service subscribers may be coupled to any one of the SSPs 2, 4, 6.

The system 100 is implemented using AIN techniques. Accordingly, the processing of calls directed to a customer's telephone line and received by an SSP from a telephone customer's line may be controlled by instructions included in customer call processing records (CPRs). In the system 100, the CPRs are stored at the Integrated Services Control Point (ISCP) 16. At least one CPR exists for each service subscriber. A customer's CPR is accessed in response to activation of an AIN trigger set at, e.g., the SSP 2, 4, or 6 to which the telephone line or lines to the subscriber's customer premises are connected.

The ISCP 16 includes an SCP 64, and an AIN provisioning system 46. A local network 67 couples the various components of the ISCP 16 together.

ISCP 16 is connected, via its SCP 64, to the SSPs via one or more signal transfer points (STPs) 12, 14 and Signaling System Seven (SS7) interconnects over which messages, data, and requests for call processing control instructions can be communicated between the SSPs 2, 4, 6, and ISCP 16.

The SCP 64 includes a multi-service application platform (MSAP) database 69 which includes customer data (CD) 71 for each of a plurality of service subscribers. The customer data 71 includes, for each customer: 1) a list of the services to which the customer subscribes; 2) a password which may be input via DTMF signals; and 3) a call processing record (CPR) which is used to instruct an SSP how to process a call in response to an AIN trigger to thereby implement the service or services to which the customer subscribes, e.g., the novel service of the present invention which involves forwarding an answered call to a voice mailbox associated with an individual corresponding to the called location.

The customer data 71 which includes call processing records 73 is generated, at least initially, by the AIN provisioning system 46 in response to input received from a service representative or operator. Customer data in the database 71 may, after initial provisioning of a service for a customer, be updated by the customer via the Internet and the use of a Web browser by accessing and modifying the contents of the customer data 71.

Among other things, the AIN provisioning system circuitry 46 is responsible for setting and/or updating AIN triggers, including mid-call triggers and/or Terminating Attempt Triggers (TATs), at the various signal switching points (SSPs) required to implement AIN based services to the subscribers. In addition to setting AIN triggers, the AIN provisioning system circuitry 46 is responsible for generating and/or updating customer data, e.g., call processing records 73, and other information stored in various locations in the system 100, as required to implement a service order. As will be discussed below, one or more IPs 10, 20 are used to provide voice mail services as part of the service of the present invention. Thus, in addition to updating information in the customer database 71, the AIN provisioning system circuitry 46 is responsible for updating information in the various IPs 10 and 20. The updating of the IPs and the setting of AIN triggers can be performed by the AIN provisioning system circuitry 46 through communications with the various system components conducted via SS7 links to the ISCP 16.

In order to implement various services, such as voice mail and other services, IPs 10, 20 are used. The first voice mail IP 10 is an interactive IP which is capable of performing DTMF signal detection operations, recording and storing messages as part of a voice mail service, as well as playing voice prompts and messages to customers. In other embodiments of the invention the IP may have different and/or additional capabilities including interactive voice recognition.

Voice Mail IP 10 is coupled to the first SSP 2 via audio (voice) and signaling lines. In this manner, the Voice Mail IP 10 can interact with other components of the system 100, e.g., ISCP 16, via communications transmitted through the SSP 2. The Voice Mail IP 10 may be implemented using known hardware. Accordingly, the hardware used to implement Voice Mail IP 10 will not be described in detail.

The Voice Mail IP 10 serves as a platform by which a service subscriber can update his/her service information, e.g., voice dialing directory information, through a telephone. A service subscriber can establish a service updating or management session with the Voice Mail IP 10, by dialing a telephone number associated with the Voice Mail IP 10. Dialing of the Voice Mail IP's telephone number results in the subscriber's call being routed to SSP 2 and a voice/DTMF connection to the Voice Mail IP 10 being established.

Voice Mail IP 10 includes various security features, e.g., customer identification and password entry requirements, to insure that customers are limited to accessing and updating their own service records and not those of other service subscribers.

Voice mail IP 20, coupled to SSP 6, can be used to provide voice mail services to subscribers.

Figure 2:
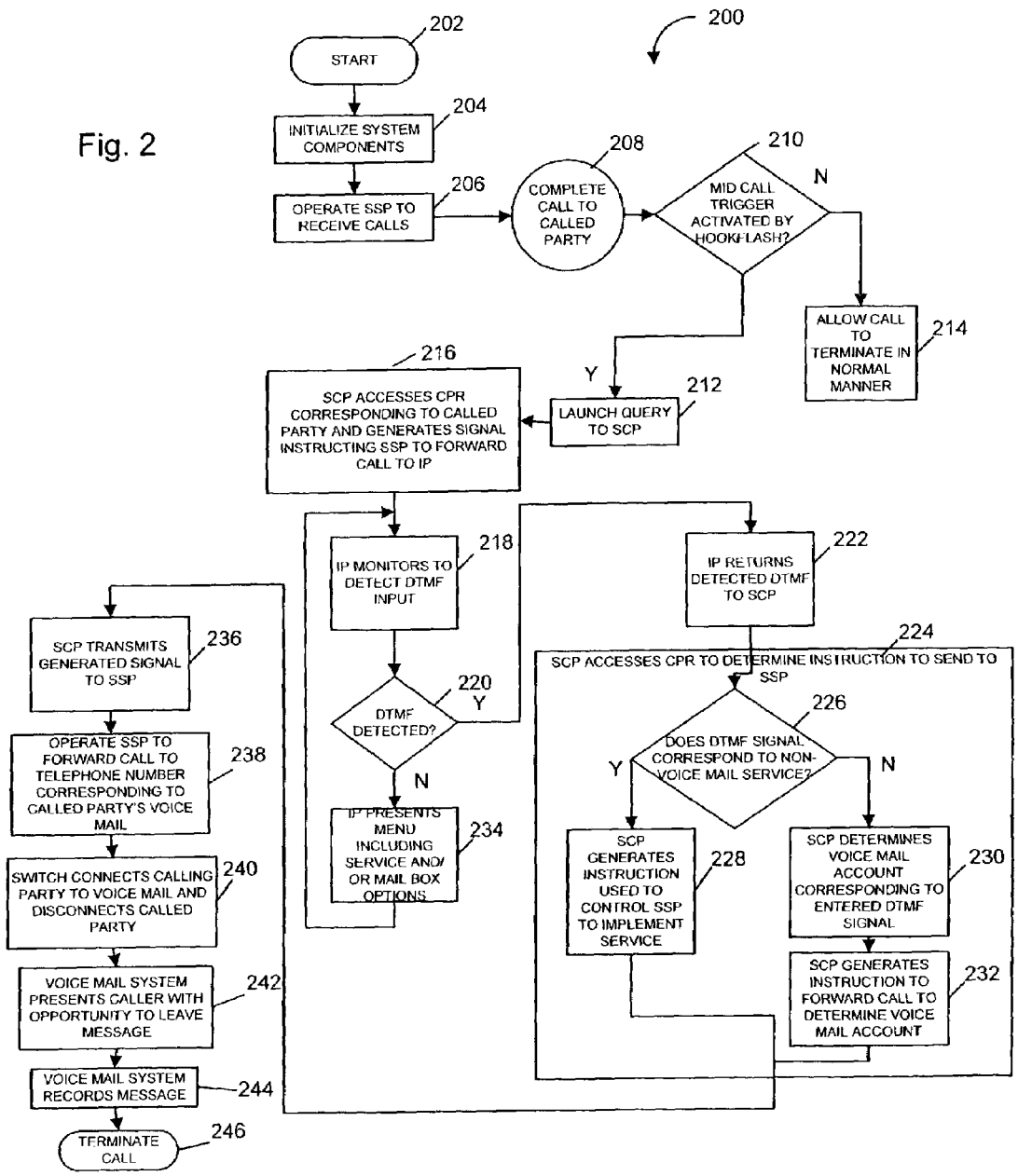
FIG. 2 illustrates a first exemplary call transfer/voice mail method of the present invention.

FIG. 2 illustrates the steps associated with one method of implementing the combined call forwarding and voice mail service of the present invention. In the method illustrated in FIG. 2, a mid-call trigger is used to allow a called party to transfer an answered call to a specified voice mailbox, e.g., the voice mailbox of a particular family member. The method allows signals indicating which of a plurality of possible AIN services is being requested to be entered thereby supporting compatibility with other AIN services. The method starts in step 202, e.g., with the system being placed into operation. Then, in step 204 the components of system 100 are initialized.

After initialization, in step 206, the SSPs 2, 4 and 6 are operated to receive calls. Operation proceeds from step 206 to step 208 when a call is received by an SSP 2, 4, or 6.

For the purposes of explaining the invention, a calling party, e.g., an individual placing a call, is located at customer premise 25. In the exemplary cases described below, the calling party is the person who placed the call to first customer premise 22.

For the purposes of explaining the invention, a called party is presumed to be located at the first customer premise 22. The called party is the individual or individuals to whom a called telephone number corresponds. For purposes of explaining the invention, it will be assumed that a call is placed to a telephone number corresponding to customer premise 22. The person located at customer premise 22 who answers the phone call, i.e., the answering individual, while he may be a member of the called party, e.g., family, may not be the particular individual for whom the call was intended.

In step 208, the call is completed to the called party, and conversation may proceed between the calling party and the answering individual. In this embodiment, a mid-call trigger remains set on the subscriber's line ready to detect and trigger an SCP response to an action, e.g., hook flash, initiated by the answering individual.

In an exemplary call, the calling party may ask the answering individual if a certain family member is home. In the exemplary call, if the requested family member was not at home, the answering individual may decide to perform a hook flash to transfer the call to voice mail. The answering individual can do this by briefly depressing and releasing the switch hook on the customer premise's telephone 38.

In step 210, the SSP determines if a mid-call trigger was activated by a hook flash triggered by the called party. If the hook flash mid-call trigger is not activated, e.g., because the called party does not perform a hook flash operation, the call is allowed to terminate in a normal manner in step 214. This is likely to occur when, e.g., the requested family member is at home, and the desired family member answered the call or was summoned to the phone and took the call after it was answered by someone else.

If, however the mid-call trigger was activated in step 210, the hook flash would be detected and operation proceeds to step 212. The hook flash is normally activated by the answering individual e.g., to initiate a call transfer to voice mail in accordance with the invention because the desired individual was not available to take the call or because the called party wants to activate another AIN service.

In step 212, in response to activation of the mid-call trigger, at SSP 2, a query, e.g., request for call processing instructions, is launched to the SCP 69. The incoming call includes, e.g., calling party ID information such as the calling party telephone number, the called party telephone number and the original called party telephone number. The query typically includes this information. In response to the query, in step 216, the SCP opens the CPR 73 corresponding to the called party using the received called party telephone number to identify the correct CPR 73 and generates a signal, e.g., message, instructing SSP 2 to forward, e.g., connect the call to IP 10.

Once the call is connected to the IP 10 in step 218, the IP 10 monitors the call to detect DTMF input. DTMF signals are used to identify which voice mailbox the call is to be transferred to. Each family may have multiple mailboxes, e.g., one for each family member. In an exemplary case, the answering individual may know the DTMF code corresponding to the mailbox for a requested family member who is not presently at home and may enter it at this time. For example, the answering individual may enter *1 for MOM, *2 for DAD, *3 for Jane, one of the children in the exemplary family. A two tone or longer sequence, e.g., *+digit, is used to avoid accidental call transfers to the wrong mailbox. However, a single tone could be used to identify a mailbox, e.g., in the case of fewer than 9 mailboxes. In cases where the service subscriber subscribes to more than on service, the detected DTMF tone may indicate that a service other than the voice mail transfer service is desired. For example, the received tone may indicate that the caller is to be played a pre-recorded message refusing sales calls followed by automatic call termination without further called party involvement.

In step 220, the IP 10 determines whether or not a DTMF signal has been detected. In step 220, if DTMF was not detected, this results in IP 10 presenting a menu including services and/or mailbox options in step 234. The menu may be provided using text to speech functionality in the IP to present the menu in audio form.

In an exemplary case, the answering individual may wish to transfer the call to the requested party's mailbox, but cannot remember the correct DTMF code; therefore, he may wait for the menu to be presented to him. From step 234, operation loops back to step 218, wherein IP 10 again monitors the call to detect DTMF input.

If the IP 10 determined that DTMF signal was detected in step 220, the IP 10 returns the detected DTMF to the SCP in step 222. The reception of the DTMF by the SCP 64 results in step 224, wherein the SCP 64 accesses its CPR 73 to determine the instructions to send to the SSP 2. The CPR 73 has information on other AIN services, if any, to which the customer subscribes.

Figure 4:
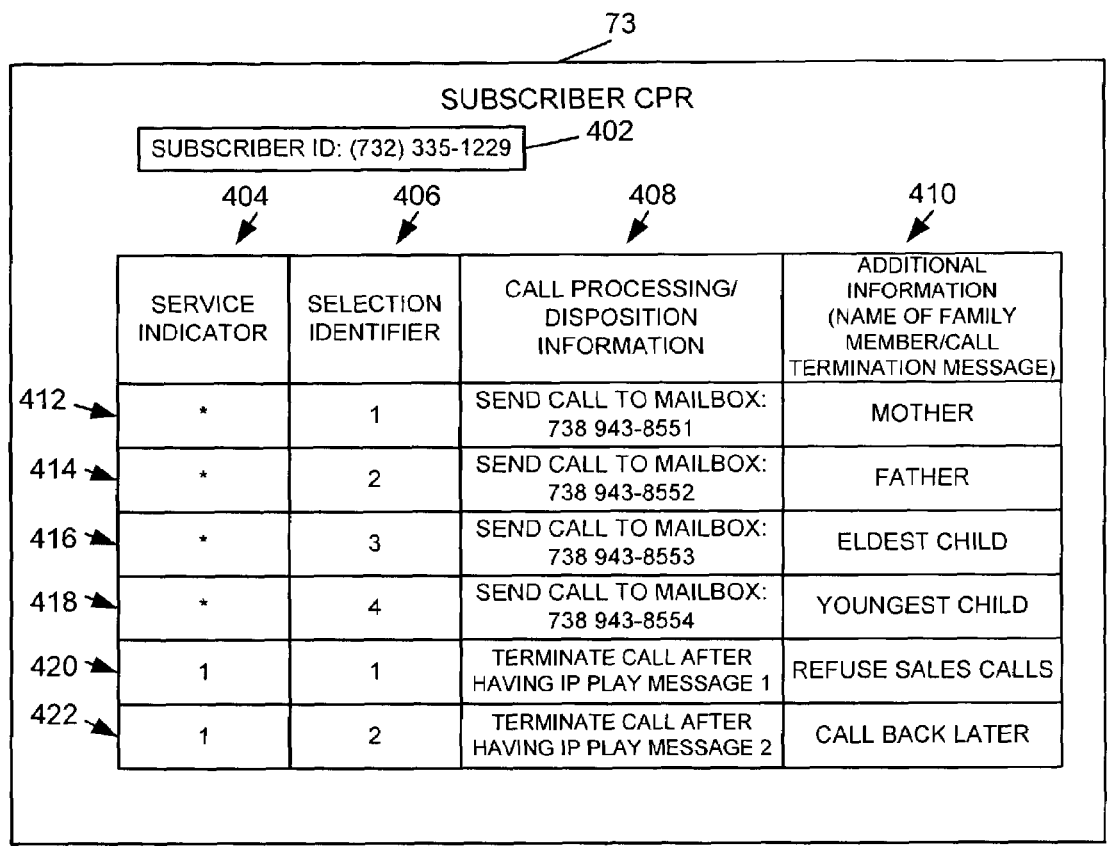
FIG. 4 illustrates an exemplary call processing record (CPR) which may be used to implement the service of the present invention in various embodiments.

FIG. 4 shows an exemplary CPR 73 corresponding to one service subscriber which is suitable for use in the conjunction with the FIG. 2 service implementation method. The SCP 64 normally includes a plurality of different call processing records 73, e.g., one for each service subscriber. The exemplary CPR 73 is for the subscriber who is identified by the phone number (732) 335-1229. A TAT or other AIN trigger may be set on the line identified by the subscriber phone number. This number which is used to identify the subscriber and the telephone line associated with the subscriber is stored in the CPR 73 and used to identify the CPR when it is needed, e.g., by comparing it to the called party number received in a request for call processing instructions.

The CPR 73 includes information used to provide one or more AIN services to the identified subscriber. In the FIG. 4 example, two services are supported, 1) a send to voice mail service and 2) a terminate call with a selected message service associating different service indicators with different types of information.

Each row 412 through 422 corresponds to different possible service selection which may be selected in regard to one of the services which are to be provided. Each column 404, 406, 408, 410 includes information used in providing a service which may be selected. The first column 404 includes the service indicator, a value which may be entered using a DTMF signal which identifies the desired service. The second column 406 lists the selection identifier corresponding to each possible service selection. The selection identifier may be entered by a subscriber as a second DTMF value following the service indicator. The third column 408 lists call processing/disposition information used to provide the selected service and to generate the call processing instructions needed for the service. The fourth column 410 lists additional information, e.g., the name of the party associated with a mailbox or the type of message to be played upon call termination. Such information is useful, e.g., for managing and/or updating the CPR information.

Rows 412, 414, 416 and 418 include information corresponding to the send to voice mail service of the present invention which can be used to send an answered call to a voice mailbox corresponding to one of a plurality of family members. With regard to the first service, each row corresponds to a different voice mailbox, e.g., one per family member, to which a subscriber can redirect an answered call.

The service indicator * is used to indicate the send to voice mail service of the present invention. thus, the first column 404 of the first four rows each include a *. Associated with this service indicator value are different mailbox identifiers, e.g., 1, 2, 4. Each voice mailbox identifier corresponds to, e.g., a different family member. A multi-digit voice mailbox identifier, e.g., a telephone number used to indicate the mailbox of the particular individual to which an answered call is to be forwarded, is included in call processing information 408 for each of rows 412, 414, 416, 418. The telephone number of the voice mailbox may be interpreted as a second voice mailbox identifier which is selected based on the selection identifier 406 entered by the service subscriber.

In the FIG. 4 example, a second service which is used to terminate an answered call after playing a selected message to the calling party is also supported. Rows 420 and 422 correspond to this second service which is identified by the service indicator 1. The service allows the user to terminate the call with one of various messages to be played, e.g., a refuse sales call message and a please call back later message. Each of these possible selections is identified by a different selection identifier found in column 406. DTMF values 1 and 2 which may be entered to select between a refuse sales call message corresponding to value 1 and a "sorry we are not available to take the call, please try back later" message corresponding to value 2.

In accordance with the invention, the SCP 64 determines based on the first detected DTMF value, which service the subscriber is seeking to utilize. For example, when the exemplary FIG. 4 CPR 73 is used, when the first DTMF value is a *, the SCP 64 will interpret the received signal as an attempt to use the send to voice mail service but when the first DTMF value detected is a "1", the SCP 64 will interpret the requested service as being a terminate call with a message service. The second detected DTMF value is used to indicate the desired selection given the service indicated by the entered service indicator and, in the case of the send to voice mail service, allows the answering party to specify the particular mailbox the call is to be sent to.

Referring once again to FIG. 2, Within step 224, a test is performed on the received DTMF signal in sub-step 226 to determine whether or not the received DTMF signal corresponds to a service other than the send to voice mail service. This involves, e.g., examining the first DTMF value to determine if it indicates a transfer to voice mail service selection. If the SCP 64 determines that the DTMF signal does correspond to a non-voice mail service, then in sub-step 228, the SCP 64 generates instructions, e.g., a message, that is used to control SSP 2 to implement the alternative service. However, if the received DTMF signal does not correspond to a non-voice mail service, but rather a voice mailbox corresponding to a called party member, operation proceeds to step 230. In sub-step 230, SCP 64 determines the voice mail account corresponding to the entered DTMF signal. In an exemplary case, a different pre-selected DTMF signal may correspond to a voice mailbox for each family member, for example *1=mother, *2=father, *3=eldest child, *4=youngest child where * indicates the send to voice mailbox service and the number indicates the particular mailbox to which the call is to be sent. Then, in step 232, the SCP 64 generates instructions to forward the call to the appropriate voice mailbox. Each voice mailbox may correspond to a different telephone number. In such a case, it is possible to forward a call to the voice mailbox by signaling the SSP to forward the call to the telephone number corresponding to the identified voice mailbox. The subscriber's CPR usually includes information, e.g., the telephone number or another identifier for each of one or more mailboxes to which an answered call can be sent.

In either sub-step 228 or sub-step 232 of step 224, SCP 64 has generated instructions for the SSP 2. Upon completion of those instructions, SCP 64 transmits generated signals, e.g., in the form of a message, to SSP 2 in step 236. Assuming the message sent to the SSP instructs the SSP to forward the call to the telephone number corresponding to the designated voice mailbox, next, in step 238, the SSP 2 forwards the call to the telephone number corresponding to the called party's voice mail. This will result in the call being completed, for example, to the IP 10 assuming Voice Mail IP 10 provides the selected voice mailbox. Next, in step 240, as part of the forwarding operation, the switch connects the calling party to voice mail, and disconnects the called party at premise 22. Now, in step 242 the voice mail system presents the caller with an opportunity to leave a message. The message is subsequently recorded in step 244, and then the call is terminated in step 246.

In cases where multiple AIN based services are not provided to the called party, the voice mail IP 10 can collect the DTMF tones identifying the desired mailbox, connect the call to the mailbox, and disconnect the called party without further SCP involvement.

Figure 3:
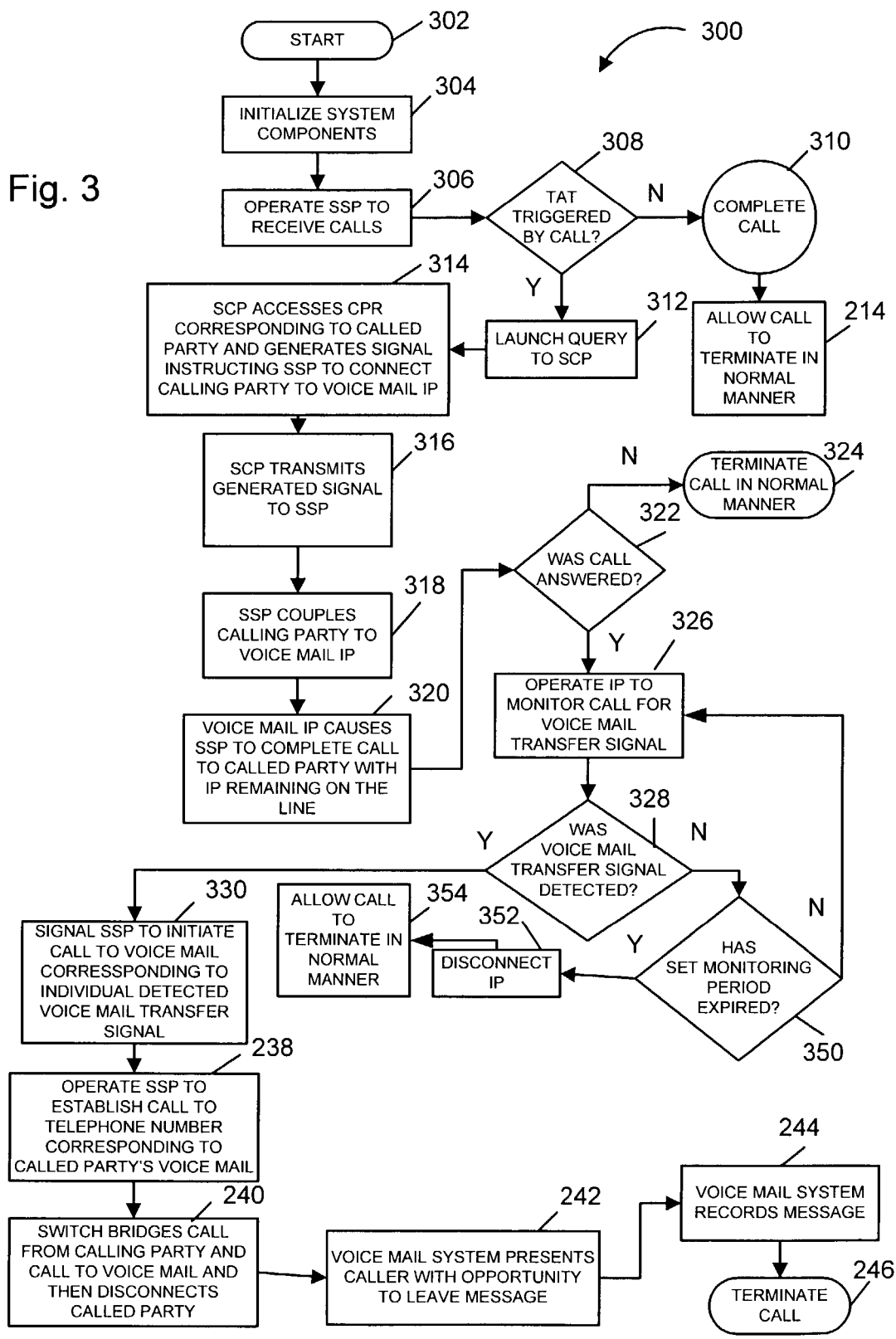
FIG. 3 illustrates another exemplary call transfer/voice mail method of the present invention.

FIG. 3 illustrates another embodiment of the present invention which uses a terminating attempt trigger (TAT) instead of a mid call trigger. The method starts in step 302. Then, in step 304 the components of system 100 are initialized. At this point in time, a Terminating Attempt Trigger (TAT) trigger has been set on each service subscriber's line as part of the process of provisioning the service of the present invention.

After initialization, in step 306, the SSPs 2, 4 and 6 are operated to receive calls. Operation proceeds from step 306 to step 308 when a call is received by an SSP 2, 4, or 6. In step 308, a determination is made at the SSP receiving the call as to whether or not an AIN terminating attempt trigger (TAT) was triggered by a call, e.g., because the call is to a called party number corresponding to a service subscriber line on which a TAT was set.

If no TAT was set on the called line, operation proceeds to step 310 wherein the call is completed to the called number without SCP involvement. Operation proceeds from step 310 to step 214 wherein the call is allowed to terminate in a normal manner.

However, if a TAT was set on the called line, e.g., because the line corresponds to a service subscriber, the TAT is triggered in step 308 and operation proceeds to step 312. For purposes of explanation, it will be assumed that a call was directed to a service subscriber located at CP1 22 and that SSP 2 received the call.

In step 312, in response to activation of the trigger (T) 3, in this embodiment a TAT, at SSP 2, a query, e.g., request for call processing instructions, is launched to the SCP 69. The query includes the telephone number of the called party, e.g., the telephone number of the first service subscriber. In response to the query, in step 314, the SCP opens the CPR 73 corresponding to the called party, using the received called party telephone number to identify the correct CPR, and generates a message instructing the SSP 2 to connect the call to the Voice Mail IP 10. After generation of the control message in step 314, in step 316 the SCP 64 transmits the generated message to SPP 2.

Then, in step 318, in response to the control message, the SSP 2 couples the call to the first voice mail IP 10. Proceeding to step 320, the voice mail IP 10 causes SSP 2 to complete the call to the called party premise 22 with the IP 10 remaining on the line. This may be accomplished by the IP 10 placing a second call to the called party and then bridging the first and second calls. Note that the SCP instructs the SSP to allow this second call to be completed to the called party since it is from the IP 10. In step 322 a check is performed by the SSP2 as to whether or not the second call was answered. If the call goes unanswered, the original call as well as the second call are terminated in step 324. However, if the call is answered at CP1 22, the IP 10 is operated in step 326 to monitor the call for a voice mail transfer signal. In step 328, the IP 10 decides whether or not a voice mail transfer signal was detected.

As in the previous example, the calling party may ask the answering individual for a certain family member who is not at home. The answering individual may know the DTMF code corresponding to the mailbox for the requested family member who is not presently at home and may enter it at this time. The DTMF code acts as a voice mail transfer signal. A two-tone sequence, *+digit, may, and in various embodiments is, used to avoid accidental call transfers should the answering individual accidentally hit a digit while talking to the calling party.

In step 328 the IP 10 determines whether or not a DTMF voice mail transfer signal has been detected. If the voice mail transfer signal was not detected by IP 10, a test is performed in step 350 to determine whether a set monitoring period, for example, 30 seconds, has expired. If the monitoring period has not expired, operation returns to step 326 where the IP 10 continues to monitor the call for the voice mail transfer signal. However, if the set monitoring period tested in step 350 has expired, operation proceeds from step 350 to step 352, wherein the IP 10 ceases monitoring of the call. This may be done, e.g., by disconnecting a DTMF detector included in the IP 10 from the call or disconnecting the IP 10 altogether. This frees up resources at the IP 10, e.g., the DTMF monitoring circuitry, to service other calls without having to terminate the ongoing call. The call is subsequently allowed to terminate in a normal manner in step 354. By limiting IP monitoring to a period of time, the IP resources are not tied up for extended periods of time, e.g., after a call has been answered and the called party decides to stay on the line.

In step 328 if the voice mail transfer signal was detected, operation proceeds to step 330. In step 330, the SSP 2 is signaled to initiate a call to a voice mailbox corresponding to the detected voice mail transfer signal. Then, in step 238, the SSP is operated to establish the call to the telephone number corresponding to the called party's voice mail. Operation proceeds to step 240, wherein the switch bridges the call from the calling party at premise 25 and call to voice mail, for example voice mail within first voice mail IP 10, and then disconnects called party premise CP1 22. Next, in step 242, the voice mail system presents the calling party with the opportunity to leave a message. In step 244, the voice mail system records the message, and the call is terminated in step 246.

What is claimed is:

1. A method of providing a telephone service, the method comprising:
    storing in a set of service information corresponding to a first telephone service subscriber, information associating values corresponding to different DTMF tones with different voice mailboxes;
    setting an AIN terminating attempt trigger on a telephone line corresponding to a service subscriber;
    detecting when said AIN terminating attempt trigger is activated by a call;
    operating a service control point to control a telephone switch to couple said call to an intelligent peripheral device in response to activation of the AIN terminating attempt trigger, wherein said coupling to said intelligent peripheral device occurs prior to said call being answered;
    operating the peripheral device to detect DTMF values entered on said call, after said call has been answered;
    identifying a mailbox corresponding to said DTMF values, by comparing said values entered on said call to said values stored in said subscriber information; and
    transferring the call to the one of said voice mailboxes corresponding to said identified values.

2. The method of claim 1, further comprising:
    storing multiple sets of service information, each set of service information corresponding to a different telephone service subscriber, each set of service information including information associating values corresponding to different DTMF tones with different voice mailboxes corresponding to different members of said service subscriber's family.

3. The method of claim 2, further comprising:
    storing in at least some of said multiple sets of service information, service information corresponding to different AIN services identified by different service identifier values which may be entered using DTMF tones.

4. The method of claim 3, wherein each of said multiple sets of service information correspond to a different telephone line on which an AIN terminating attempt trigger is set.

5. The method of claim 4, further comprising:
    operating the intelligent peripheral device to cease monitoring said call for DTMF tones after a preselected period of time.

6. The method of claim 5, further comprising:
    disconnecting said intelligent peripheral device from said call without terminating said call following expiration of said preselected period of time.

7. The method of claim 4, further comprising:
    determining if the call is to be transferred to a voice mailbox based on a first DTMF value detected by said intelligent peripheral device.

8. The method of claim 7, wherein the value of a second detected DTMF tone is compared to said set of stored values to determine the voice mailbox to which said telephone call is to be transferred.

9. The method of claim 7, wherein said first detected value is used to determine which one of a plurality of AIN services is to be provided.

10. A telephone communications system comprising:
    a plurality of sets of call processing service information, each set of call processing service information corresponding to a different telephone line, each set of service information including information associating values corresponding to different DTMF tones with different voice mailboxes corresponding to different members of a service subscriber family;
    a telephone switch coupled to a plurality of subscriber premises by telephone lines, an AIN terminating attempt trigger being set at said telephone switch for each telephone line corresponding to one of said plurality of sets of call processing service information;
    a peripheral device for detecting DTMF values entered on an answered call after activation of one of said AIN terminating attempt triggers;
    a service control point for controlling said switch to couple said call to said peripheral device prior to said call being answered in response to activation of said AIN terminating attempt trigger; and
    means for transferring the answered call to one of a plurality of voice mailboxes as a function of at least one detected DTMF value entered after said call was answered.

11. The system of claim 10,
    wherein said plurality of sets of call processing service information are AIN call processing records.

12. The system of claim 10, wherein said peripheral device is located in a telephone network which includes said telephone switch.

13. The system of claim 10,
    wherein said peripheral device includes:
        means for ceasing said monitoring of said answered call if DTMF tones are not detected within said preselected period of time.

14. The system of claim 11, wherein at least one of said AIN call processing records includes information used to provide multiple AIN services to a service subscriber, said at least one of said AIN call processing records including different service indicator values which may be entered using DTMF signals for different services and a plurality of mailbox identifiers for at least one of the different services for which service identifiers are included in said call processing record.

* * * * *